US012718753B2

(12) United States Patent
Li et al.

(10) Patent No.: US 12,718,753 B2
(45) Date of Patent: Aug. 25, 2026

(54) DISPLAY MODULE, METHOD FOR CONTROLLING LIGHT STRIP BASED ON DISPLAY MODULE, AND DISPLAY DEVICE

(71) Applicant: BOE Technology Group Co., Ltd., Beijing (CN)

(72) Inventors: Tianji Li, Beijing (CN); Mingi Chu, Beijing (CN); Lirong Wang, Beijing (CN); Zhiqiang Dong, Beijing (CN); Huiwen Ma, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 18/995,129

(22) PCT Filed: May 14, 2024

(86) PCT No.: PCT/CN2024/093122

§ 371 (c)(1),
(2) Date: Jan. 15, 2025

(87) PCT Pub. No.: WO2025/001566

PCT Pub. Date: Jan. 2, 2025

(65) Prior Publication Data

US 2026/0031032 A1 Jan. 29, 2026

(30) Foreign Application Priority Data

Jun. 29, 2023 (CN) ......................... 202310788309.0

(51) Int. Cl.
*G09G 3/3233* (2016.01)
*G09G 3/3208* (2016.01)
(Continued)

(52) U.S. Cl.
CPC ........... *G09G 3/3208* (2013.01); *H05B 45/10* (2020.01); *H05B 45/20* (2020.01); *H05B 45/60* (2020.01);
(Continued)

(58) Field of Classification Search
CPC ......... G09G 3/3208; G09G 2320/0242; G09G 2320/0633; G09G 2320/0646;
(Continued)

(56) References Cited

U.S. PATENT DOCUMENTS

| | | | | |
|---|---|---|---|---|
| 2009/0237567 | A1 | 9/2009 | Tsao | |
| 2013/0016133 | A1* | 1/2013 | Chen | G09G 3/3426 362/609 |
| 2019/0057652 | A1* | 2/2019 | Lee | H04N 5/57 |

FOREIGN PATENT DOCUMENTS

| | | | |
|---|---|---|---|
| CN | 101558641 | A | 10/2009 |
| CN | 109215597 | A | 1/2019 |

(Continued)

*Primary Examiner* — Abdul-Samad A Adediran
(74) *Attorney, Agent, or Firm* — IPro, PLLC

(57) ABSTRACT

Provided is a display module, including a display panel and a timing controller. The brightness adjustment module in the timing controller is connected to the light strip control module, and the light strip control module in the timing controller is connected to the light strip; the brightness adjustment module is configured to adjust brightness of pixels of a first video frame to be played to acquire a second video frame and a total pixel brightness of the second video frame; the brightness adjustment module is further configured to drive the display panel to display the second video frame and send the total pixel brightness to the light strip control module; and the light strip control module is configured to control an emission color and brightness of the light strip based on color information and the total pixel brightness.

20 Claims, 7 Drawing Sheets

(51) Int. Cl.
*H05B 45/10* (2020.01)
*H05B 45/20* (2020.01)
*H05B 45/60* (2022.01)

(52) U.S. Cl.
CPC ............... *G09G 2320/0242* (2013.01); *G09G 2320/0633* (2013.01); *G09G 2320/0646* (2013.01)

(58) Field of Classification Search
CPC ...... G09G 3/3426; H05B 45/60; H05B 45/20; H05B 45/10; H04N 5/57
USPC .......................................................... 362/609
See application file for complete search history.

(56) References Cited

FOREIGN PATENT DOCUMENTS

| | | | |
|---|---|---|---|
| CN | 110010088 | A | 7/2019 |
| CN | 109743812 | B | 2/2021 |
| CN | 113613363 | A | 11/2021 |
| CN | 114040249 | A | 2/2022 |
| CN | 116798354 | A | 9/2023 |

* cited by examiner

DISPLAY MODULE, METHOD FOR CONTROLLING LIGHT STRIP BASED ON DISPLAY MODULE, AND DISPLAY DEVICE

This application is a U.S. national stage of international application No. PCT/CN2024/093122, filed on May 14, 2024, which claims priority to Chinese Patent Application No. 202310788309.0, titled "DISPLAY MODULE, LAMP STRIP CONTROL METHOD BASED ON DISPLAY MODULE AND DISPLAY DEVICE", filed on Jun. 29, 2023, the entire content of which is incorporated herein by reference.

TECHNICAL FIELD

The disclosure relates to the field of image processing, particularly, to a display module, a method for controlling a light strip based on a display module, and a display device.

BACKGROUND

With the rapid development of mobile internet, users' requirements for the display effect of display panels (such as TV screens) in display modules are also increasing.

In the related technology, a display module is cooperated with an immersive lighting system, which includes a light strip and a light strip control chip. The light strip is set around the display panel of the display module, and the light strip control chip is set in the system-on-chip (SoC) of the display module. The SoC outputs video frames to be played to the display module to control the display panel to display the video frames. The SoC adjusts the brightness of the light strip around the display panel based on the output video frames, which makes the light strip emit light corresponding to the video frames, thereby creating a sense of boundless sophistication. Additionally, the light strip can flash in rhythm with the audio information of the video frame, enhancing the atmosphere and experience of watching videos.

SUMMARY

Embodiments of the present disclosure provide a display module, a method for controlling light strip based on a display module, and a display device. The technical solution is as follows.

According to some embodiments of the present disclosure, a display module is provided, which includes a display panel and a timing controller. The display panel is connected to the timing controller, and a light strip is disposed at a periphery of the display panel; wherein the timing controller includes a brightness adjustment module and a light strip control module, wherein the brightness adjustment module is connected to the light strip control module, and the light strip control module is connected to the light strip; wherein the brightness adjustment module comprises a first processor, and the light strip control module comprises a second processor;

the first processor is configured to adjust brightness of pixels of a first video frame to be played to acquire a second video frame and a total pixel brightness of the second video frame;

the first processor is further configured to drive the display panel to display the second video frame and send the total pixel brightness of the second video frame to the light strip control module; and the second processor is configured to control an emission color and emission brightness of the light strip based on color information of the first video frame and the total pixel brightness of the second video frame, wherein the color information indicates colors of the pixels of the first video frame.

In some embodiments, the first processor is configured to:

adjust the brightness of the pixels of the first video frame based on a brightness adjustment amplitude corresponding to a total pixel brightness of the first video frame among multiple brightness adjustment amplitudes to acquire the second video frame and the total pixel brightness of the second video frame, wherein the multiple brightness adjustment amplitudes correspond to different total pixel brightness.

In some embodiments, the first processor is configured to:

in a case that a total pixel brightness of each third video frame in multiple third video frames is the same as a total pixel brightness of the first video frame, and a total display duration of the multiple third video frames is greater than or equal to a first duration, reduce the brightness of the pixels of the first video frame to acquire the second video frame and the total pixel brightness of the second video frame, wherein the multiple third video frames are video frames displayed on the display panel preceding the second video frame.

In some embodiments, the brightness adjustment module includes a first brightness adjustment unit and a second brightness adjustment unit, wherein the first brightness adjustment unit, the second brightness adjustment unit, and the display panel are connected in sequence, and the second brightness adjustment unit is further connected to the light strip control module; wherein the first brightness adjustment unit comprises a first sub-processor, and the second brightness adjustment unit comprises a second sub-processor;

the first sub-processor is configured to adjust the brightness of the pixels of the first video frame based on a brightness adjustment amplitude corresponding to a total pixel brightness of the first video frame among multiple brightness adjustment amplitudes to acquire a fourth video frame and a total pixel brightness of the fourth video frame, and send the fourth video frame and the total pixel brightness of the fourth video frame to the second brightness adjustment unit, wherein the multiple brightness adjustment amplitudes correspond to different total pixel brightness;

the second sub-processor is configured to, in a case that a total pixel brightness of each third video frame in multiple third video frames is the same as the total pixel brightness of the fourth video frame, and a total display duration of the multiple third video frames is greater than or equal to a first duration, reduce the brightness of the pixels of the fourth video frame to acquire the second video frame and the total pixel brightness of the second video frame, wherein the multiple third video frames are video frames displayed on the display panel preceding the second video frame; and the second sub-processor is further configured to drive the display panel to display the second video frame and send the total pixel brightness of the second video frame to the light strip control module.

In some embodiments, the first brightness adjustment unit is further connected to the display panel and the light strip control module;

the first sub-processor is further configured to, in a case that the second brightness adjustment unit is not in operation, drive the display panel to display the fourth video frame and send the total pixel brightness of the fourth video frame to the light strip control module; and the second processor is configured to control the emission color and the emission brightness of the light strip based on the color information and the total pixel brightness of the fourth video frame.

In some embodiments, the first brightness adjustment unit is further connected to the display panel and the light strip control module;

the first sub-processor-is further configured to send the total pixel brightness of the fourth video frame to the light strip control module; and the second processor is further configured to, in a case that the total pixel brightness of the fourth video frame and the total pixel brightness of the second video frame are acquired, control the emission color and the emission brightness of the light strip based on the color information and the total pixel brightness of the second video frame.

In some embodiments, the timing controller is connected to a system-on-chip of the display module; wherein the first processor is configured to acquire the first video frame from the system-on-chip; and the second processor is configured to acquire the color information from the system-on-chip.

In some embodiments, the timing controller is connected to the system-on-chip of the display module;

the first processor is configured to acquire the first video frame from the system-on-chip; and the second processor is configured to acquire the color information of the first video frame by performing a color extraction on the first video frame.

In some embodiments, the first video frame includes multiple zones, and the color information includes total color values corresponding to each zone of the multiple zones, wherein each total color value is a sum of color values of pixels in the zone;

the second processor is further configured to:

divide the first video frame into the multiple zones, wherein the multiple zones are all located at an edge of the first video frame;

acquire the total color values corresponding to each zone of the multiple zones based on the color values of the pixels in the zone.

In some embodiments, the second processor is further configured to:

in a case that the display panel is in a blank screen maintenance state, control emission effect of the light strip based on a blank screen maintenance progress of the display panel, such that the emission effect indicates the blank screen maintenance progress.

According to some embodiments of the present disclosure, a method for controlling a light strip based on the display module mentioned in the above embodiments is provided. The method is performed by the timing controller and includes:

adjusting brightness of pixels of a first video frame to be played to acquire a second video frame and a total pixel brightness of the second video frame;

driving the display panel to display the second video frame;

controlling an emission color and emission brightness of the light strip based on color information of the first video frame and the total pixel brightness of the second video frame, wherein the color information indicates colors of the pixels of the first video frame.

In some embodiments, adjusting the brightness of the pixels in the first video frame to be played to acquire the second video frame and the total pixel brightness of the second video frame includes:

adjusting the brightness of the pixels of the first video frame based on a brightness adjustment amplitude corresponding to a total pixel brightness of the first video frame among multiple brightness adjustment amplitudes to acquire the second video frame and the total pixel brightness of the second video frame, wherein the multiple brightness adjustment amplitudes correspond to different total pixel brightness.

In some embodiments, adjusting the brightness of the pixels in the first video frame to be played to acquire the second video frame and the total pixel brightness of the second video frame includes:

in a case that a total pixel brightness of each third video frame in multiple third video frames is the same as a total pixel brightness of the first video frame, and a total display duration of the multiple third video frames is greater than or equal to a first duration, reducing the brightness of the pixels of the first video frame to acquire the second video frame and the total pixel brightness of the second video frame, wherein the multiple third video frames are video frames displayed on the display panel preceding the second video frame.

In some embodiments, adjusting the brightness of the pixels in the first video frame to be played to acquire the second video frame and the total pixel brightness of the second video frame includes:

adjusting the brightness of the pixels of the first video frame based on a brightness adjustment amplitude corresponding to a total pixel brightness of the first video frame among multiple brightness adjustment amplitudes to acquire a fourth video frame and a total pixel brightness of the fourth video frame, wherein the multiple brightness adjustment amplitudes correspond to different total pixel brightness;

in a case that a total pixel brightness of each third video frame in multiple third video frames is the same as the total pixel brightness of the fourth video frame, and a total display duration of the multiple third video frames is greater than or equal to a first duration, reducing the brightness of the pixels of the fourth video frame to acquire the second video frame and the total pixel brightness of the second video frame, wherein the multiple third video frames are video frames displayed on the display panel preceding the second video frame.

In some embodiments, after acquiring the fourth video frame and the total pixel brightness of the fourth video frame, the method further includes:

driving the display panel to display the fourth video frame;

controlling the emission color and the emission brightness of the light strip based on the color information and the total pixel brightness of the fourth video frame.

In some embodiments, before controlling the emission color and the emission brightness of the light strip based on the color information of the first video frame and the total pixel brightness of the second video frame, the method includes:

acquiring the first video frame and the color information from a system-on-chip of the display module.

In some embodiments, before controlling the emission color and the emission brightness of the light strip based on the color information of the first video frame and the total pixel brightness of the second video frame, the method includes:

acquiring the first video frame from a system-on-chip of the display module;

acquiring the color information of the first video frame by performing a color extraction on the first video frame.

In some embodiments, the first video frame includes multiple zones, and the color information includes total color values corresponding to each zone of the multiple zones, wherein each total color value is a sum of color values of pixels in the zone;

acquiring the color information of the first video frame by performing the color extraction on the first video frame includes:

dividing the first video frame into the multiple zones, wherein the multiple zones are all located at an edge of the first video frame;

acquiring the total color values corresponding to each zone of the multiple zones based on the color values of the pixels in the zone.

In some embodiments, the method further includes:

in a case that the display panel is in a blank screen maintenance state, controlling an emission effect of the light strip based on a blank screen maintenance progress of the display panel, such that the emission effect indicates the blank screen maintenance progress.

According to some embodiments of the present disclosure, a display device is provided. The display device includes a system-on-chip and the display module mentioned in the above embodiments, wherein the system-on-chip is configured to provide video frames to be played for the display module.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description illustrate merely some embodiments of the present disclosure, and a person of ordinary skill in the art may still derive other drawings from these accompanying drawings without creative efforts.

DETAILED DESCRIPTION

To make the objective, technical solutions, and advantages of the present disclosure clearer, embodiments of the present disclosure will be further described in detail with reference to the accompanying drawings.

In the present application, terms such as "first," "second," and the like, are used to distinguish between similar elements with substantially the same function. It should be understood that "first," "second," "nth," and the like, do not imply a logical or temporal dependency, and do not limit the number or execution order. It should be further understood that, although the following description uses the terms first, second, etc. to describe various elements, these elements should not be limited by these terms.

These terms are only used to distinguish one element from another. For example, without departing from the scope of the various examples, the first element could be termed the second element, and, similarly, the second element could be termed the first element. Both the first and second elements can be elements, and in some cases, may be separate and distinct elements.

At least one refers to one or more, for example, at least one element refers to one element, two elements, three elements, and any integer elements greater than or equal to one. At least two refers to two or more, for example, at least two elements refer to two elements, three elements, and any integer elements greater than or equal to two.

In some practices, the brightness of the video frame actually displayed on the display panel differs from the brightness of the video frame output by the SoC, especially in the display panel of an organic light-emitting diode television (OLED TV). The timing controller circuit in OLED TV has powerful image processing capabilities, which leads to differences in the brightness of the light strip and the brightness of the video frame actually displayed, preventing the light strip's brightness from synchronizing with the actual display brightness of the video frames, thereby reducing the display effect of the light strip.

Figure 1:
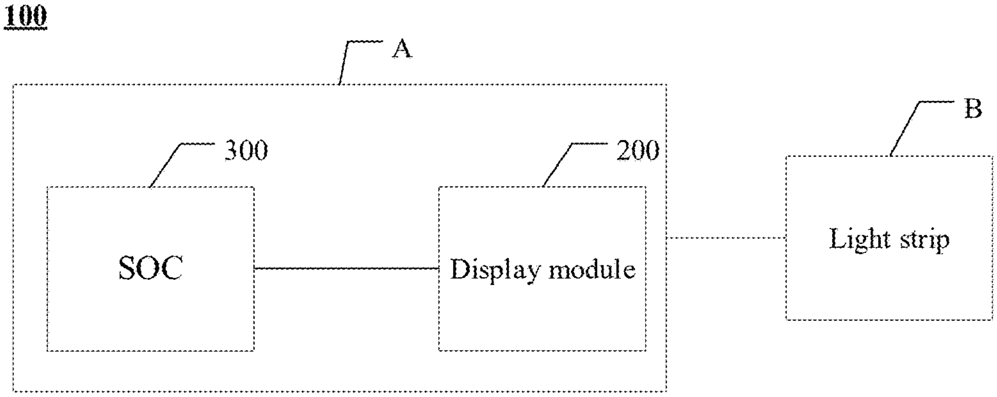
FIG. 1 is a schematic diagram of an immersive lighting system architecture based on a display module according to some embodiments of the present disclosure.

FIG. 1 is a schematic diagram of an immersive lighting system architecture based on a display module according to some embodiments of the present disclosure. As shown in FIG. 1, the immersive lighting system 100 includes a display device A and a light strip B. The display device A may be installed on a terminal (such as a TV, home theater equipment, etc.) that supports video playback, which is not limited by the present disclosure.

The display device A is configured to display video frames of a video to be played. The display device A is connected to the light strip B. The display device A is further configured to control the emission brightness and the emission color of the light strip B based on the color information and brightness information of the video frames, such that the emission brightness of the light strip B synchronizes with the brightness of the video frames currently displayed on the display device A, and the emission color of the light strip B synchronizes with the color of the video frames currently displayed on the display device A, thereby achieving an immersive experience for users when watching videos. The color information of the video frames indicates the color of the pixels in the video frames, and the brightness information of the video frames indicates the brightness level (i.e., brightness) of the video frames. The emission color of the light strip B refers to the color of the light emitted by the light strip B, and the emission brightness of the light strip B refers to the brightness of the light emitted by the light strip B.

As shown in FIG. 1, the display device A includes a display module 200 and a system-on-chip (SoC) 300, wherein the SoC 300 is connected to the display module 200. The SoC 300 is configured to acquire the video stream of a video to be played and provide the video frames in the video stream to the display module 200, and the display module 200 displays the video frames in the video stream. The display module 200 is configured to, before displaying each video frame, first process the video frame to change its brightness and/or color, and then display the processed video frame, such that the final displayed video frame differs from the video frame output by the SoC 300 in terms of brightness and/or color.

Figure 2:
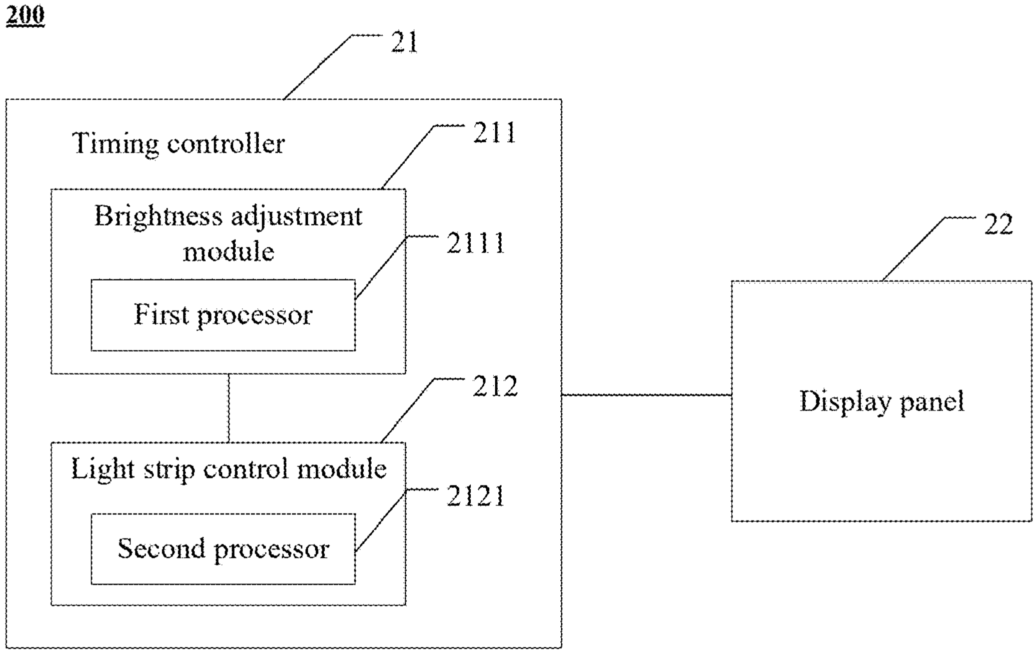
FIG. 2 is a structural diagram of a display module according to some embodiments of the present disclosure.

Next, the working principle of the display module 200 is introduced with reference to the structural diagram of the display module provided in FIG. 2 of the present disclosure.

As shown in FIG. 2, the display module 200 includes a timing controller (Tcon) 21 and a display panel 22, where the display panel 22 is the video display module of the display module 200 and is used to display video frames. The display panel 22 may be an organic light-emitting diode (OLED) panel, a light-emitting diode (LED) panel, a twisted nematic (TN) panel, a vertical alignment (VA) panel, or an in-plane switching (IPS) panel. In the present disclosure, the type of the display panel 22 is not limited.

Figure 3:
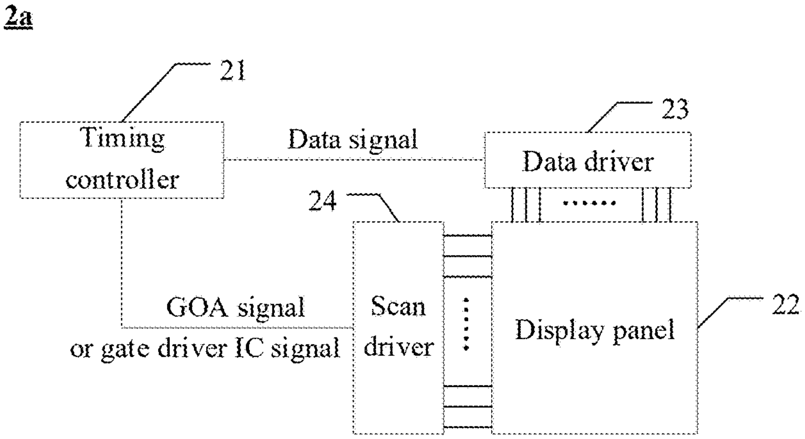
FIG. 3 is a structural diagram of another display module according to some embodiments of the present disclosure.

The timing controller 21 is connected to the display panel 22. For any video frame in the video stream from the SoC 300, the timing controller 21 performs at least one image processing on the video frame, and drives the display panel 22 to display the processed video frame. For example, as shown in FIG. 3, which is a structural diagram of another display module provided by the present application, the display module 2*a* includes a timing controller 21, a display panel 22, a data driver 23, and a scan driver 24. The timing controller 21 also includes an interface connected to the display panel 22, and the interface is further connected to the data driver 23 and the scan driver 24. The timing controller 21 sends the processed video frame to the interface, and the interface, based on the processed video frame, sends data signals to the data driver 23 and gate driven on array (GOA) signals or gate driver IC signals to the scan driver 24, to make the data driver 23 and the scan driver 24 drive the display panel 22 to display the video frame.

The periphery of the display panel 22 supports the setting of a light strip (such as light strip A). The timing controller 21 is also configured to control the emission color and emission brightness of the light strip based on the color information and brightness information of the processed video frame, such that the emission color of the light strip synchronizes with the color of the video frame displayed on the display panel, and the emission brightness of the light strip synchronizes with the brightness of the video frame displayed on the display panel, which creates a sense of boundless sophistication and enhancing the atmosphere and experience of watching videos, thereby achieving an immersive experience.

As shown in FIG. 2, the timing controller 21 includes a brightness adjustment module 211 and a light strip control module 212. The brightness adjustment module 211 is a module in the timing controller 21 used to adjust the brightness of the video frame, and the brightness of the video frame displayed on the display panel 22 is controlled by the brightness adjustment module 211; wherein the brightness adjustment module 211 comprises a first processor 2111, and the light strip control module 212 comprises a second processor 2121.

In some embodiments, the brightness adjustment module 211 includes multiple brightness adjustment units, each of the multiple brightness adjustment units supports adjusting the brightness of the video frame. The multiple brightness adjustment units have different brightness adjustment logics. These multiple brightness adjustment units have different priorities, thus forming a multi-level brightness adjustment unit. According to the priority from high to low, the multiple brightness adjustment units form a brightness adjustment pipeline for the video frame. The priority of the brightness adjustment unit indicates its order in the brightness adjustment pipeline. Accordingly, the multiple brightness adjustment units are connected in sequence according to their priority. For the video frame to be processed by the brightness adjustment module 211, the video frame first reaches the brightness adjustment unit with the highest priority. After the brightness adjustment unit with the highest priority adjusts the brightness of the video frame, it transmits the video frame with the adjusted brightness to the next-level brightness adjustment unit, which continues to adjust the brightness of the video frame, and so on, until the brightness adjustment unit with the lowest priority adjusts the brightness and outputs the video frame with the adjusted brightness. The display panel 22 displays the video frame based on the brightness information output by the brightness adjustment unit with the lowest priority. In other embodiments, at least one of the multiple brightness adjustment units has its own brightness adjustment conditions. When the input video frame meets the brightness adjustment condition corresponding to a brightness adjustment unit, the brightness adjustment unit adjusts the brightness of the input video frame. Therefore, when the video frame flows through these multiple brightness adjustment units, some brightness adjustment units may not adjust the brightness of the video frame.

Figure 4A:
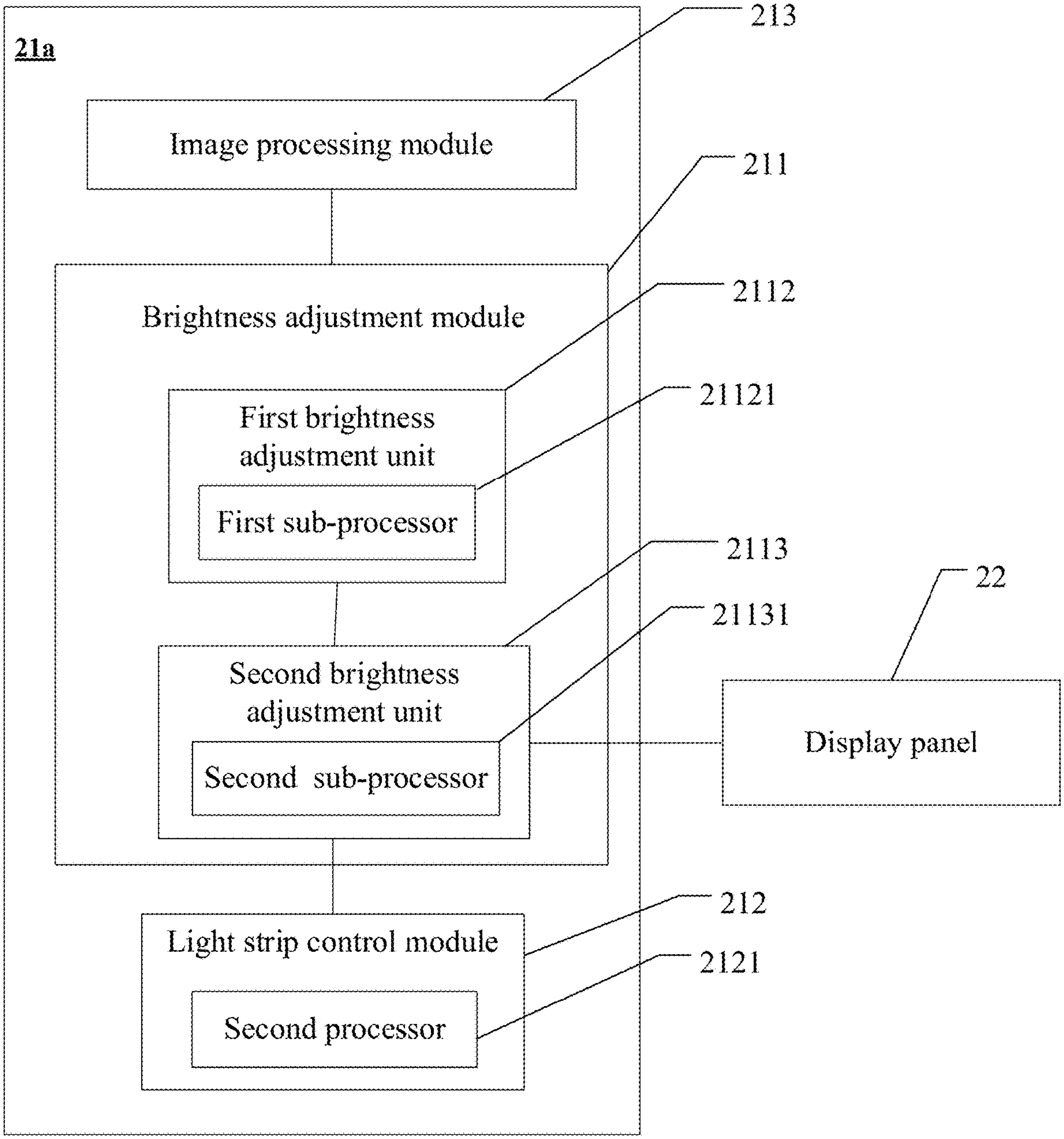
FIG. 4A is a structural diagram of another display module according to some embodiments of the present disclosure.
Figure 4B:
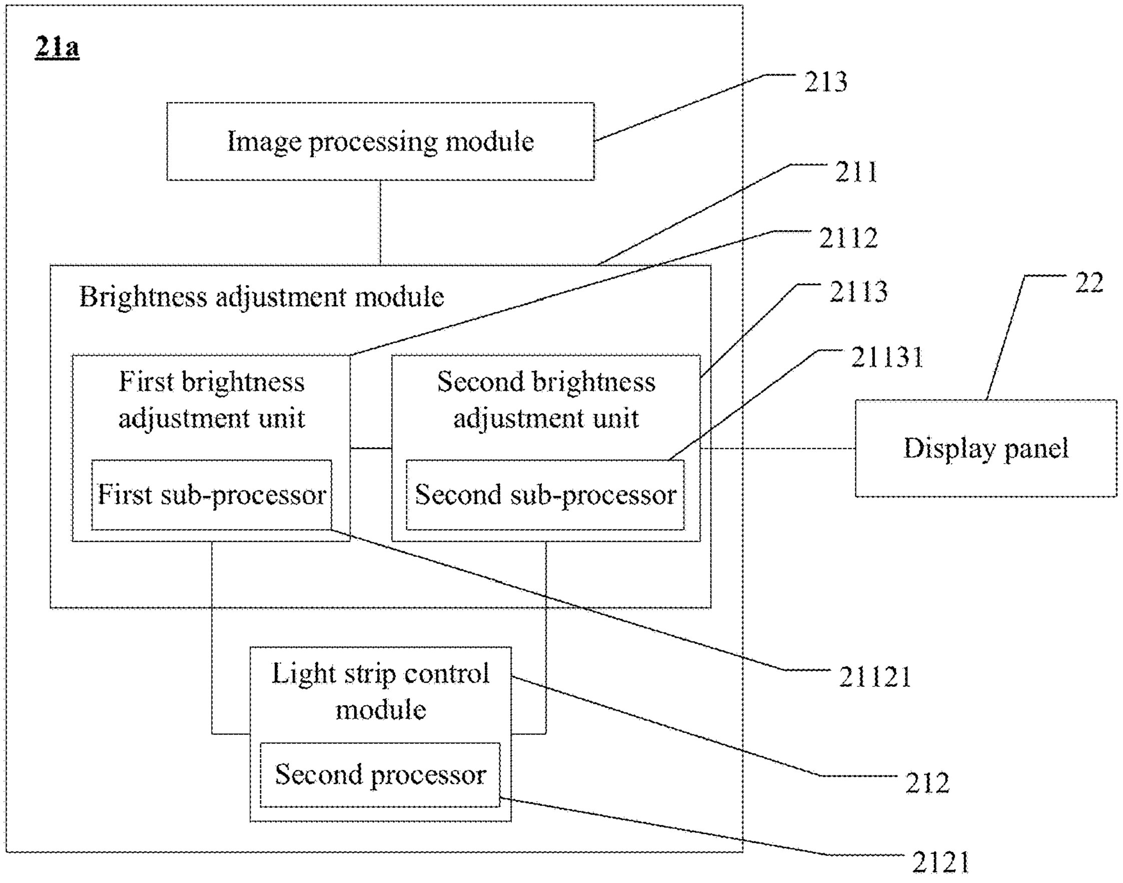
FIG. 4B is a structural diagram of another display module according to some embodiments of the present disclosure.

For example, as shown in FIG. 4A or FIG. 4B, which is a structural diagram of another display module provided by the present application, the brightness adjustment module 211 of the display module 21*a* includes a first brightness adjustment unit 2112 and a second brightness adjustment unit 2113, where the first brightness adjustment unit 2112 is connected to the second brightness adjustment unit 2113, and the priority of the first brightness adjustment unit 2112 is higher than that of the second brightness adjustment unit 2113; wherein the first brightness adjustment unit 2112 comprises a first sub-processor 21121, and the second brightness adjustment unit 2113 comprises a second sub-processor 21131. The first brightness adjustment unit 2112 and the second brightness adjustment unit 2113 have different brightness adjustment logics for the video frame. For example, the first brightness adjustment unit 2112 adjusts the brightness of the video frame according to the automatic brightness limit (ABL) algorithm or the peak luminance control (PLC) algorithm, and the second brightness adjustment unit 2113 adjusts the brightness of the video frame according to the automatic static brightness limit (ASBL) algorithm or the temperature peak luminance control (TPC) algorithm. Both the ABL algorithm and the PLC algorithm control the brightness performance of the display panel inconsistently through average picture level (APL), which defines the proportion of bright and dark areas in the displayed image (i.e., video frame) and is described in a manner similar to "screen ratio." Both the ASBL algorithm and the TPC algorithm control the brightness of the video frame to gradually decrease as the display panel displays static images (i.e., video frames). In other embodiments, the brightness adjustment module 211 may include more than two brightness adjustment units, and the number of brightness adjustment units in the brightness adjustment module 211 is not limited in the present disclosure.

In other embodiments, the brightness adjustment module 211 does not include multiple brightness adjustment units, and the brightness adjustment module 211 itself is a brightness adjustment unit.

Referring to FIG. 2, the brightness adjustment module 211 is connected to the light strip control module 212, such that the brightness adjustment module 211 sends the brightness information of the adjusted video frame to the light strip control module 212. When the brightness adjustment module 211 includes multiple brightness adjustment units, these multiple brightness adjustment units are all connected to the light strip control module 212. For the video frame to be processed by the brightness adjustment module 211, after the video frame is input into each brightness adjustment unit according to its priority, the brightness adjustment unit may adjust the brightness of the input video frame or may not adjust the brightness of the input video frame, and then sends the input video frame or the video frame with adjusted brightness to the next-level unit (such as the next-level brightness adjustment unit or the next-level unit of the brightness adjustment module 211) and sends the brightness information of the output video frame to the light strip control module 212. Accordingly, the light strip control module 212 may receive multiple brightness information of the video frame. Based on the priority of the multiple brightness adjustment units, the light strip control module 212 selects the brightness information of the brightness adjustment unit with the lowest priority as the final brightness information of the video frame, and controls the emission brightness of the light strip based on the final brightness information, which makes the emission brightness of the light strip the same as or closer to the brightness of the video frame displayed on the display panel 22, thereby improving the display effect of the light strip. For example, in FIG. 4B, both the first brightness adjustment unit 2112 and the second brightness adjustment unit 2113 in the brightness adjustment module 211 are connected to the light strip control module 212.

In other embodiments, when the brightness adjustment module 211 includes multiple brightness adjustment units, only the brightness adjustment unit with the lowest priority among the multiple brightness adjustment units is connected to the light strip control module 212, which allows the light strip control module 212 to acquire the final brightness information of the video frame from the brightness adjustment unit with the lowest priority. For example, in FIG. 4A, the first brightness adjustment unit 2112 in the brightness adjustment module is not connected to the light strip control module 212, while the second brightness adjustment unit 2113 is connected to the light strip control module 212.

The brightness adjustment module 211 is an image processing module in the timing controller 21. In other embodiments, the timing controller 21 may also include other image processing modules besides the brightness adjustment module. In this case, the timing controller 21 includes multiple image processing modules, each of which processes the video frame in one or more ways. These multiple image processing modules are connected in sequence, forming an image processing pipeline in the timing controller 21. The video frames in the video stream from the SoC 300 enter the multiple image processing modules in sequence according to the order in the image processing pipeline. Each image processing module processes the input video frame differently, for example, the brightness adjustment module in the multiple image processing modules adjusts the brightness of the image, and other image processing modules process the video frame in ways other than brightness. After the last image processing module in the image processing pipeline processes the video frame, it sends the processed video frame to the interface connected to the display panel 22, allowing the interface to control the display panel 22 to display the processed video frame. The position of the brightness adjustment module 211 in the image processing pipeline is not limited by the present disclosure.

For example, as shown in FIG. 4A or FIG. 4B, the timing controller 21*a* also includes an image processing module 213, which is used to process the input video frame in ways other than brightness. The video frame from the SoC 300 is first input into the image processing module 213, the image processing module 213 sends the processed video frame to the brightness adjustment module 211, and the brightness adjustment module 211 adjusts the brightness of the video frame. The brightness adjustment module 211 is connected to the display panel 22, and the display panel 22 displays the video frame with adjusted brightness.

In other embodiments, the light strip control module 212 is connected to each brightness adjustment unit in the brightness adjustment module 211. For the video frame to be played, after the video frame is input into each brightness adjustment unit according to its priority, each brightness adjustment unit may adjust the brightness of the input video frame or may not adjust the brightness of the input video frame, and then sends the input video frame or the video frame with adjusted brightness to the next-level unit (such as the next-level brightness adjustment unit, the next-level image processing module or the interface in the image processing pipeline) and sends the brightness information of the output video frame to the light strip control module 212. Accordingly, the light strip control module 212 may receive multiple brightness information of the video frame to be played. Based on the priority of the multiple brightness adjustment units, the light strip control module 212 selects the brightness information of the brightness adjustment unit with the lowest priority as the final brightness information of the video frame to be played, thus controlling the emission brightness of the light strip based on the final brightness information, which makes the emission brightness of the light strip the same as or closer to the brightness of the video frame displayed on the display panel 22, thereby improving the display effect of the light strip.

It should be understood that the timing controller 21 in FIG. 2 can be replaced by the timing controller 21*a* in FIG. 4A or FIG. 4B, and the display module 200 in FIG. 1 can be replaced by the display module 2*a* in FIG. 3.

Figure 5:
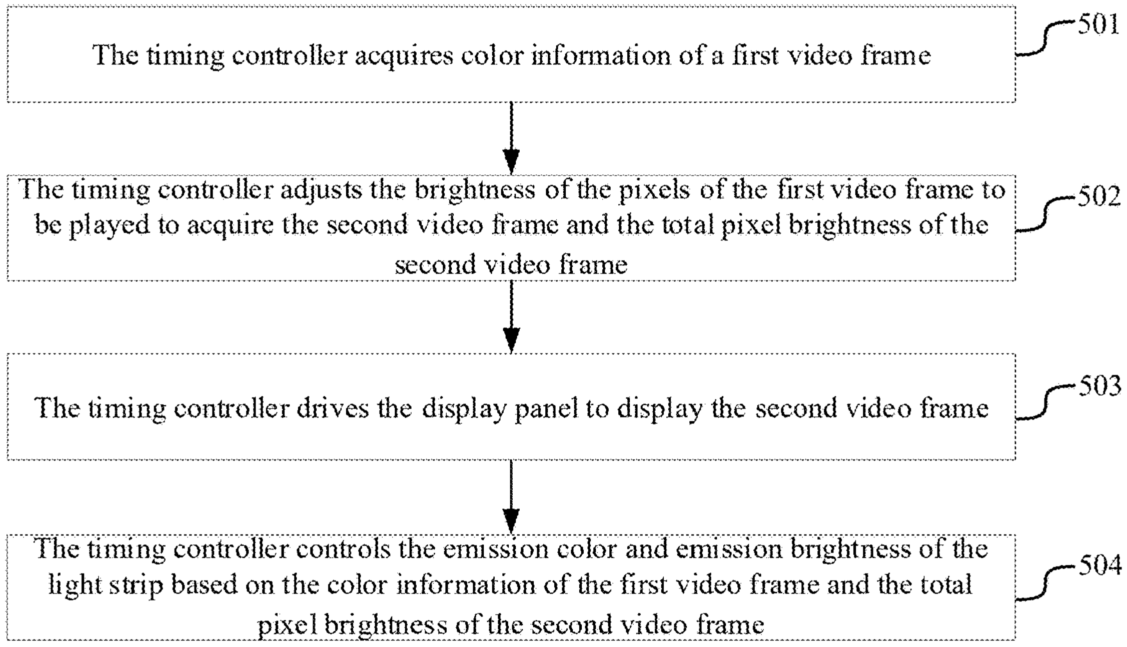
FIG. 5 is a flowchart of a method for controlling a light strip based on a display module according to some embodiments of the present disclosure.

For any of the display modules introduced above, the process for controlling the light strip is introduced with reference to the flowchart of a method for controlling a light strip based on the display module provided in FIG. 5 of the present disclosure. The method is performed by the timing controller and includes the following steps.

In 501, the timing controller acquires color information of a first video frame, the color information indicates the color of the pixels of the first video frame.

The first video frame is any video frame of the video currently played by the terminal, and the second video frame is the first video frame after brightness adjustment. In the present disclosure, any video frame includes multiple pixels, and each pixel includes multiple sub-pixels. Each sub-pixel represents a color, for example, the multiple sub-pixels are three, namely red (R), green (G), and blue (B). Alternatively, the multiple sub-pixels are four, namely R, G, B, and white (W). In other embodiments, each pixel includes more than four sub-pixels, and the number of sub-pixels in the pixel is not limited in the present disclosure. The color of each pixel is represented by the grayscale values of the multiple sub-pixels.

Figure 6:
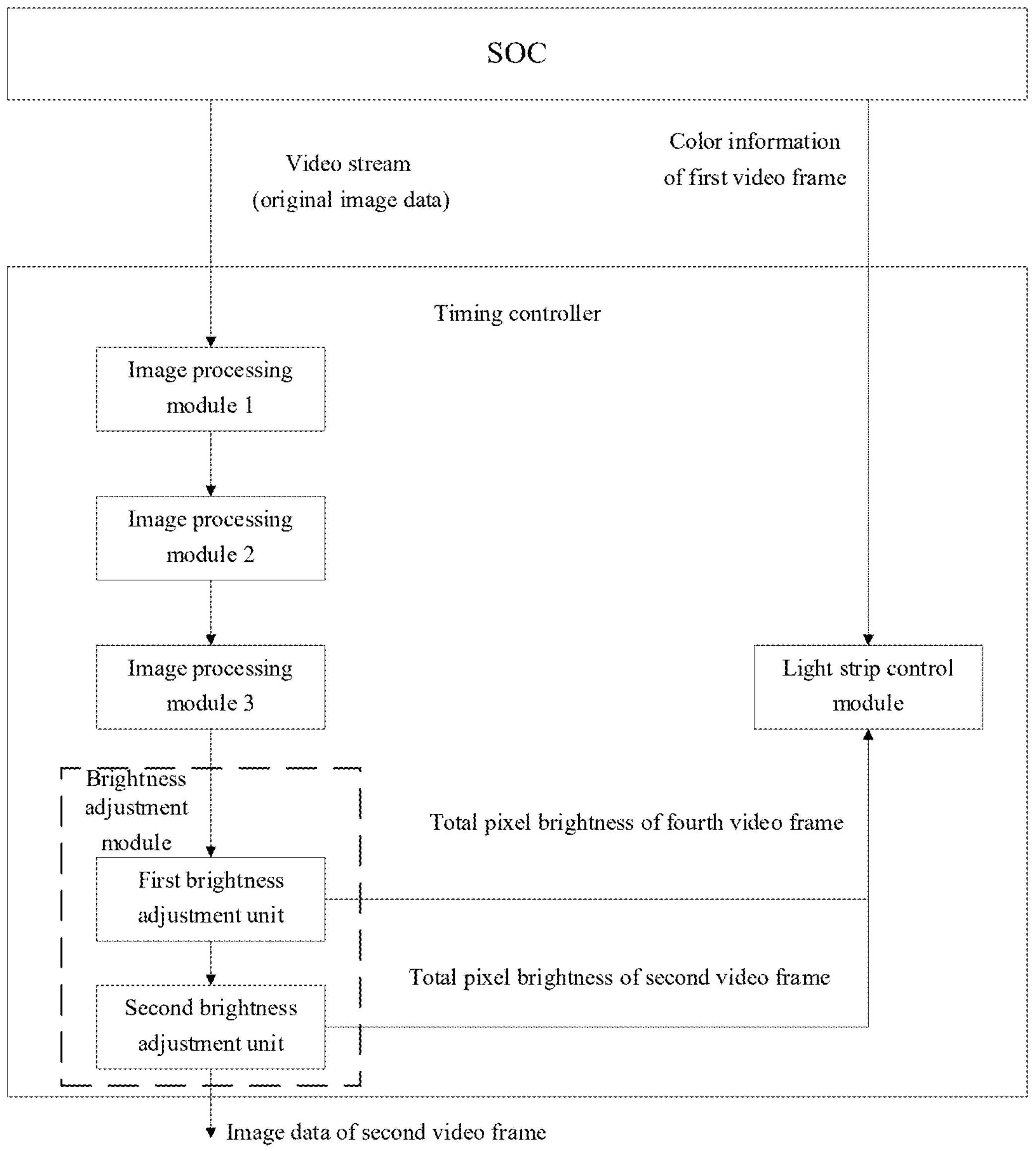
FIG. 6 is a data flow diagram of a video stream according to some embodiments of the present disclosure.

For example, as shown in the data flow diagram of the video stream provided in FIG. 6 of the present disclosure, the SoC of the display module sends the video stream of the video to be played to the timing controller. The video stream includes image data of multiple video frames. Accordingly, for the display module, the video stream is the original image data of the video. The timing controller sequentially acquires the image data of multiple video frames in the video stream, and the current acquired video frame is the first video frame. Acquiring the image data of the first video frame is equivalent to acquiring the first video frame, thus achieving the acquisition of the first video frame from the SoC of the display module.

Each video frame includes multiple pixels, and the image data of the video frame includes the color information of the video frame, which includes the color information of each pixel in the video frame. The color information of each pixel includes the grayscale values of the sub-pixels in the pixel.

As shown in FIG. 6, in addition to sending the image data of the first video frame to the timing controller, the SoC further sends the color information of the first video frame to the light strip control module in the timing controller, thus the light strip control module acquires the color information of the first video frame from the SoC.

In another possible implementation, the SoC does not provide the color information of the first video frame to the light strip control module, but the light strip control module extracts the color information of the first video frame from the video stream, such that the light strip control module controls the light strip based on the color information and the total pixel brightness of the video frame, without setting a light strip control module in the SoC, thus saving development costs.

Figure 7:
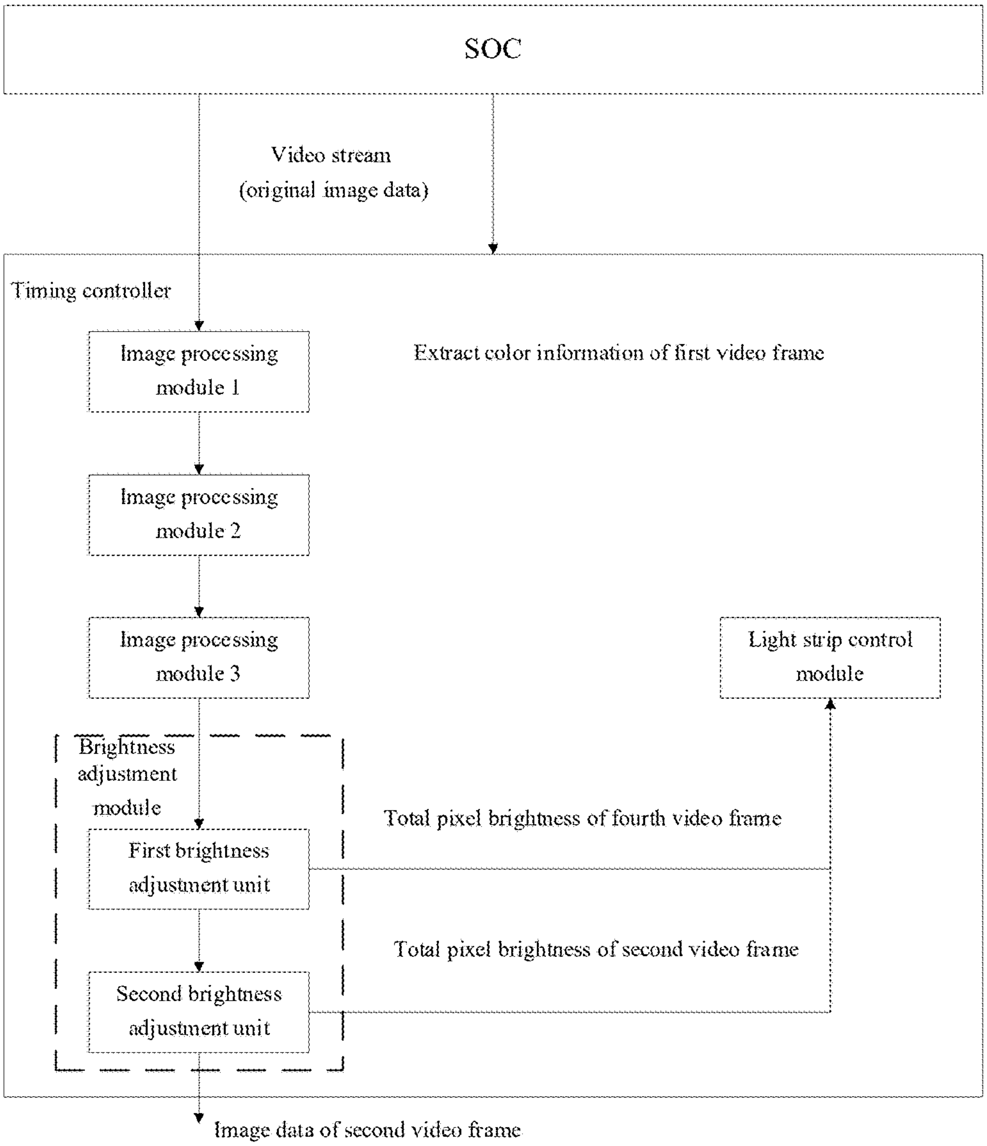
FIG. 7 is a data flow diagram of another video stream according to some embodiments of the present disclosure.

For example, as shown in the data flow diagram of the video stream provided in FIG. 7 of the present disclosure, the SoC sends the video stream to the timing controller. After acquiring the image data of the first video frame, the timing controller extracts the color information of the first video frame from the image data of the first video frame, thus achieving the color extraction of the first video frame and acquiring the color information of the first video frame.

In other embodiments, considering that the emission color of the light strip is expected to be the same as the color in the edge area of the currently displayed video frame, when extracting the color of the first video frame, the color information of the edge area of the first video frame, rather than the entire first video frame, is extracted, for example, the following steps 5011-5012.

In step 5011, the light strip control module divides the first video frame into multiple zones, at least one side of each zone is the edge of the first video frame.

Figure 8:
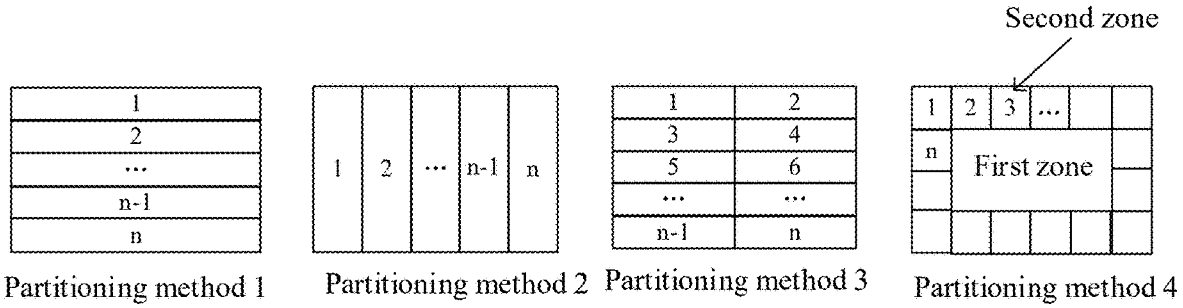
FIG. 8 is a schematic diagram of a video frame partitioning method according to some embodiments of the present disclosure.

For example, as shown in the schematic diagram of the video frame partitioning method provided in FIG. 8 of the present disclosure, the light strip control module divides the first video frame into n (n>0) zones according to any of the partitioning methods 1-4, such that at least one side of each zone is located at the edge of the first video frame.

Among them, partitioning method 1 refers to dividing the first video frame by row, partitioning method 2 refers to dividing the first video frame by column. Partitioning method 3 refers to first dividing the first video frame by row to acquire multiple row zones, such that at least one side of each row zone is located at the edge of the first video frame, and then dividing each row zone by column, or first dividing the first video frame by column to acquire multiple column zones, such that at least one side of each column zone is located at the edge of the first video frame, and then dividing each column zone by row. Partitioning method 4 refers to first dividing the first video frame into a first zone and a second zone, where the second zone includes all the edges of the first video frame, and the first zone is located inside the second zone. Along the outer edge of the first zone, the first zone is divided into n zones. Partitioning methods 1-4 are examples, and the light strip control module can also use other partitioning methods to divide the first video frame, and the partitioning method is not limited in the present disclosure.

In step 5012, the timing control module acquires the total color value of each zone of the multiple zones based on the color values of the pixels in the zone.

The color value of a pixel is the grayscale value of the sub-pixels in the pixel. The total color value of a zone is the sum of the color values of the pixels in the zone. For example, the total color value of a zone includes multiple total sub-pixel color values, which correspond to different sub-pixels, and each total sub-pixel color value is the sum of the grayscale values of the corresponding sub-pixels in the zone.

For example, for any zone, the timing control module acquires the grayscale values of the sub-pixels in the pixels in the zone from the image data of the first video frame. For any sub-pixel, the grayscale values of the sub-pixels in the pixels of the zone are summed to acquire the total sub-pixel color value of the zone for the sub-pixel. The multiple total sub-pixel color values of the zone are taken as the total color value of the zone.

After acquiring the total color values of multiple zones, the total color values of the multiple zones are taken as the color information of the first video frame.

In 502, the timing controller adjusts the brightness of the pixels of the first video frame to be played to acquire the second video frame and the total pixel brightness of the second video frame.

The first video frame is any video frame of the video currently played by the terminal, and the second video frame is the first video frame after brightness adjustment. In the present disclosure, any video frame includes multiple pixels, and each pixel includes multiple sub-pixels. Each sub-pixel represents a color, for example, the multiple sub-pixels are three, namely red (R), green (G), and blue (B). Alternatively, the multiple sub-pixels are four, namely R, G, B, and white (W). In other embodiments, each pixel includes more than four sub-pixels, and the number of sub-pixels in a pixel is not limited in the present disclosure. The color of each pixel is represented by the grayscale values of the multiple sub-pixels, and the grayscale value of each sub-pixel indicates the brightness of the pixel in the sub-pixel. The total pixel brightness of any video frame is the sum of the grayscale values of all sub-pixels of all pixels in the video frame.

The following introduces step 502 with the brightness adjustment module in the timing controller as an example.

Taking FIG. 6 and FIG. 7 as examples, for the display module, the video stream from the SoC is the original image data of the video. Accordingly, the timing controller sequentially acquires the image data of multiple video frames in the video stream, and any of the multiple video frames is taken as the first video frame. The timing controller processes the first video frame according to the image processing pipeline based on the image data of the first video frame. For example, the image data of the first video frame is first input into the image processing module 1 in the image processing pipeline. The image processing module 1 processes the first video frame according to the input image data and outputs the image data of the processed first video frame to the image processing module 2. The image processing module 2 continues to process the first video frame based on the input image data of the first video frame and outputs the image data of the processed first video frame to the image processing module 3. The image processing module 3 continues to process the first video frame based on the input image data of the first video frame and outputs the image data of the processed first video frame to the brightness adjustment module. The image data of the first video frame is input into the brightness adjustment module, and the brightness adjustment module acquires the first video frame and executes step 502 based on the input image data of the first video frame.

It should be noted that to facilitate the illustration of the data flow direction of the image data in the timing controller, FIG. 6 and FIG. 7 only take the fact that the image processing pipeline in the timing controller includes image processing modules 1-3 and the brightness adjustment module as an example. In other embodiments, the image processing pipeline may also include other image processing modules besides image processing modules 1-3, and the number of other image processing modules and their order in the image processing pipeline are not limited in the present disclosure. In other embodiments, the image processing pipeline may also include any one or any two of image processing modules 1-3, and the number of image processing modules in the timing controller and their order in the image processing pipeline structure are not limited in the present disclosure.

The multiple structures of the brightness adjustment module were introduced above. For different structures of the brightness adjustment module, the following several adjustment methods are provided.

In the case that the brightness adjustment module includes multiple levels of brightness adjustment units, taking the brightness adjustment module including a first brightness adjustment unit and a second brightness adjustment unit as an example, the brightness adjustment module adjusts the brightness of the first video frame through the following steps 5021 and 5022.

In step 5021, the first brightness adjustment unit adjusts the brightness of the pixels of the first video frame based on the brightness adjustment amplitude corresponding to the total pixel brightness of the first video frame among multiple brightness adjustment amplitudes, to acquire the fourth video frame and the total pixel brightness of the fourth video frame, wherein the multiple brightness adjustment amplitudes correspond to different total pixel brightness.

The fourth video frame is the first video frame after brightness adjustment. Each brightness adjustment amplitude is any value between −100% and 100%. The values of the multiple brightness adjustment amplitudes are different, and each brightness adjustment amplitude corresponds to a total pixel brightness range. Different brightness adjustment amplitudes correspond to different total pixel brightness ranges, and each total pixel brightness range includes multiple of pixel brightness.

After acquiring the image data of the input first video frame, the first brightness adjustment unit acquires the total pixel brightness (referred to as the first total pixel brightness) of the first video frame based on the color information of the pixels in the image data. For example, for any sub-pixel of the pixels, the grayscale values of the sub-pixel in the color information of the pixels in the image data are summed to acquire the total sub-pixel brightness corresponding to the sub-pixel. After acquiring the total sub-pixel brightness corresponding to the sub-pixel in the pixels, the total sub-pixel brightness of the sub-pixels is summed to acquire the first total pixel brightness.

After acquiring the first total pixel brightness, the first brightness adjustment unit queries, from the multiple brightness adjustment amplitudes, the brightness adjustment amplitude corresponding to the total pixel brightness range to which the first total pixel brightness belongs, and the queried brightness adjustment amplitude is the target brightness adjustment amplitude. The first total pixel brightness is increased by the target brightness adjustment amplitude to acquire the total pixel brightness of the fourth video frame (referred to as the fourth total pixel brightness), i.e., first total pixel brightness*(1+target brightness adjustment amplitude)=fourth total pixel brightness.

For the grayscale values of all sub-pixels of all pixels in the image data of the first video frame, the grayscale values of all sub-pixels are increased by the target value, such that the sum of the grayscale values of all sub-pixels equals the fourth total pixel brightness. The image data after increasing the target value is the image data of the fourth video frame, which is also the second video frame.

Figure 9:
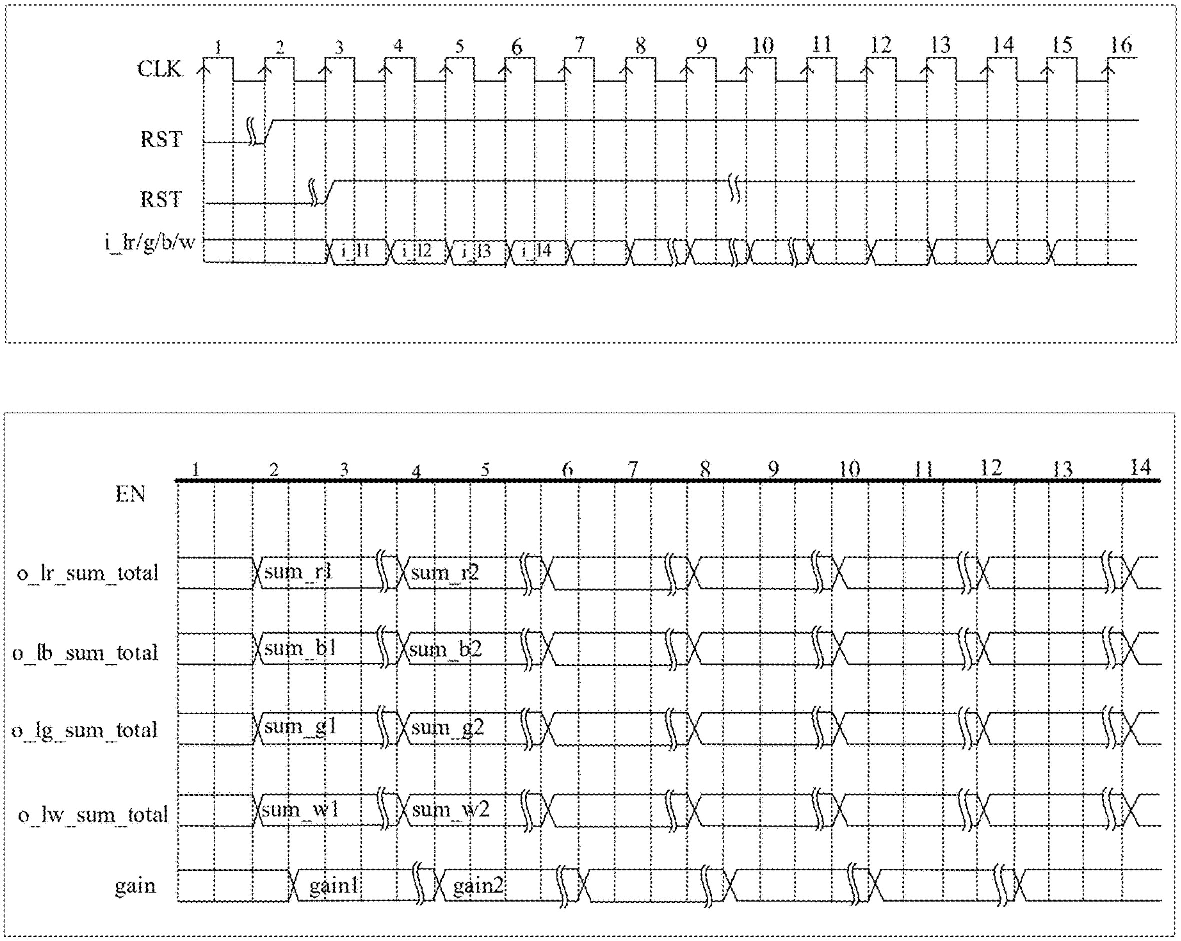
FIG. 9 is a timing diagram of a first brightness adjustment unit according to some embodiments of the present disclosure.

To further illustrate step 5021, refer to the timing diagram of the first brightness adjustment unit provided in FIG. 9 of the present disclosure. Taking the pixel including sub-pixels R, G, B, W as an example, the clock signal CLK, reset signal RST, data enable signal DE, and pixel signal i_lr/g/b/w are all input signals of the first brightness adjustment unit. The clock signal CLK is configured to ensure the transmission order of the pixel signals i_lr/g/b/w of the input video frames. The reset signal RST is the reset signal of the first brightness adjustment unit, and the reset signal RST triggers the reset of the first brightness adjustment unit when it is at a low level, and indicates that the first brightness adjustment unit is in a working state when it is at a high level. The data enable signal DE is the valid flag of the input video signal (such as the pixel signal i_lr/g/b/w) in the first brightness adjustment unit. The data enable signal DE indicates that the input video signal is invalid when it is at a low level, and indicates that the input video signal is valid when it is at a high level. The pixel signal i_lr/g/b/w is used to transmit the color information of the video frames in sequence, for example, the pixel signal i_lr/g/b/w sequentially transmits the color information i_11 of the first video frame, the color information i_12 of the second video frame, the color information i_13 of the third video frame, and the color information i_14 of the fourth video frame.

The enable signal EN is used to enable the brightness adjustment function of the first brightness adjustment unit. When the enable signal EN is at a low level, the first brightness adjustment unit turns off the brightness adjustment function. When the enable signal EN is at a high level, the first brightness adjustment unit turns on the brightness adjustment function. The total sub-pixel brightness information: o_lr_sum_total, o_lb_sum_total, o_lg_sum_total, and o_lw_sum_total, where the total sub-pixel brightness information o_lr_sum_total, o_lb_sum_total, o_lg_sum_total, and o_lw_sum_total respectively include the total sub-pixel brightness of the video frame on sub-pixels R, B, G, and W, and the brightness gain signal includes the total pixel brightness of the video frames after brightness adjustment.

Taking a first video frame carried by the input pixel signal i_lr/g/b/w as the first video frame as an example, after the brightness adjustment function is turned on, based on the color information i_l1 of the first video frame, the total sub-pixel brightness sum_r1 of the first video frame on sub-pixel R, the total sub-pixel brightness sum_b1 of the first video frame on sub-pixel B, the total sub-pixel brightness sum_g1 of the first video frame on sub-pixel G, and the total sub-pixel brightness sum_w1 of the first video frame on sub-pixel W are calculated. The total sub-pixel brightness sum_r1, sum_b1, sum_g1, and sum_w1 are summed to acquire the total pixel brightness of the first video frame. The total pixel brightness of the first video frame is adjusted by the target adjustment amplitude to acquire the total pixel brightness gain1 of the first video frame after brightness adjustment. The total pixel brightness gain1 is taken as the total brightness information gain of the first video frame after brightness adjustment and output to the second brightness adjustment unit. After acquiring the color information i_l2 of the second video frame, the color information i_l2 is processed in the same way as the color information i_l1, and so on, the total pixel brightness of the video frames after brightness adjustment is sent to the second brightness adjustment unit.

Taking FIG. 6 and FIG. 7 as examples, after acquiring the image data of the fourth video frame and the fourth total pixel brightness of the fourth video frame, the first brightness adjustment unit sends the image data of the fourth video frame and the fourth total pixel brightness to the second brightness adjustment unit, thereby achieving the sending of the fourth video frame of the fourth video frame and the total pixel brightness of the fourth video frame to the second brightness adjustment unit.

In step 5022, in the case that the total pixel brightness of each third video frame in multiple third video frames is the same as the total pixel brightness of the fourth video frame, and the total display duration of the multiple third video frames is greater than or equal to a first duration, the second brightness adjustment unit reduces the brightness of the pixels of the fourth video frame, to acquire the second video frame and the total pixel brightness of the second video frame, where the multiple third video frames are video frames displayed on the display panel preceding the second video frame.

The multiple third video frames are video frames continuously displayed on the display panel preceding the fourth video frame, and the total pixel brightness of these multiple third video frames is the same, indicating that these multiple third video frames are static video frames (i.e., static images). The first duration is the duration for which the adjustment module waits to adjust the brightness of the static video frames.

For example, multiple first durations corresponding to different total pixel brightness ranges are preset, in the case that the total pixel brightness of the current video frame is the same as that of the previous video frame, both the current video frame and the previous video frame are static video frames. Taking the total pixel brightness of the current video frame as the reference brightness, the brightness adjustment mode for the static video frames with the reference brightness is initiated based on the first duration corresponding to the total pixel brightness range of the reference brightness.

Within the first duration, if the total pixel brightness of the acquired video frame is the reference brightness, the brightness of the video frame is not processed.

Within the first duration, if the total pixel brightness of the acquired video frame is the reference brightness, the video frame acquired within the first duration is taken as the third video frame. For each video frame acquired after the first duration, if the total pixel brightness of the video frame is the reference brightness, the total pixel brightness of the video frame is reduced by a brightness threshold. If the total pixel brightness of the video frame is not the reference brightness, the brightness of the video frame is not adjusted, and the brightness adjustment mode for the static video frames with the reference brightness is turned off.

Alternatively, after the first duration, if the total pixel brightness of multiple video frames acquired subsequently is the reference brightness, the total pixel brightness of these multiple video frames is reduced by a brightness threshold every second duration. For example, after the first duration, a second timer is initiated. If the total pixel brightness of multiple video frames acquired within the second duration is the reference brightness, the total pixel brightness of these multiple video frames is reduced by a brightness threshold. After the second duration, the second timer is reset. If the total pixel brightness of multiple video frames acquired within the next second duration is the reference brightness, the total pixel brightness of these multiple video frames is reduced by two brightness thresholds, and so on. If the total pixel brightness of any video frame acquired after the second timer is initiated is not the reference brightness, the brightness adjustment mode for the static video frames with the reference brightness is turned off.

Accordingly, if the fourth video frame is a video frame acquired within the first duration, the brightness of the fourth video frame is not processed. If the fourth video frame is a video frame acquired after the first duration, the total pixel brightness of the fourth video frame is adjusted according to the above method, and the adjusted total pixel brightness of the fourth video frame is the second total pixel brightness of the second video frame.

Figure 10:
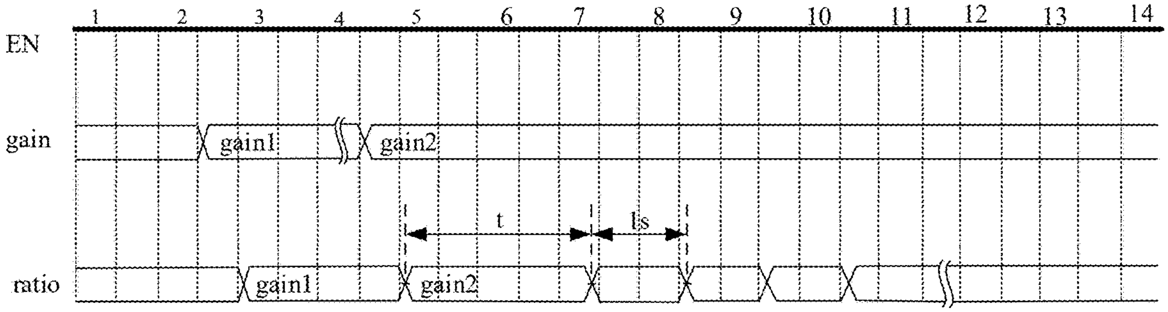
FIG. 10 is a timing diagram of a second brightness adjustment unit according to some embodiments of the present disclosure.

To further illustrate step 5022, refer to the timing diagram of the second brightness adjustment unit provided in FIG. 10 of the present disclosure. The enable signal EN is used to enable the brightness adjustment function of the second brightness adjustment unit. When the enable signal EN is at a low level, the second brightness adjustment unit turns off the brightness adjustment function. When the enable signal EN is at a high level, the second brightness adjustment unit turns on the brightness adjustment function. The first brightness adjustment unit outputs the total brightness information gain of the video to the second brightness unit, and the total brightness information gain includes the total pixel brightness (such as gain1, gain2) of multiple video frames after brightness adjustment. For example, the total pixel brightness of the m-th video frame after brightness adjustment is gain1, and the total pixel brightness of the second video frame after brightness adjustment is gain2. When the enable signal EN is at a high level and the video frame corresponding to gain 1 is detected to be a static video frame, gain1 is taken as the reference brightness, and after a first duration t, the output ratio value is reduced by a brightness threshold every second (i.e., second duration) on the basis of gain1. If the gain value acquired after the first duration t changes, the output ratio value immediately becomes the current acquired gain value, where the ratio value is also the total pixel brightness of the video frame output by the second brightness adjustment module.

For the grayscale values of all sub-pixels of all pixels in the image data of the fourth video frame, the grayscale values of all sub-pixels are increased by a target value, such that the sum of the grayscale values of all sub-pixels equals the second total pixel brightness. The image data after increasing the target value is the image data of the second video frame, which is also the second video frame.

As shown in FIG. 6 and FIG. 7, after acquiring the image data and the second total pixel brightness of the second video frame, the second brightness adjustment unit outputs the second total pixel brightness of the second video frame to the light strip control module. If the brightness adjustment module is the last image processing module in the image processing pipeline, the second brightness adjustment unit sends the image data of the second video frame to the interface of the timing controller connected to the display panel. If there are other image processing modules after the brightness adjustment module in the image processing pipeline, the second brightness adjustment unit outputs the image data of the second video frame to other image processing modules, which process the second video frame. Ultimately, the last image processing module in the image processing pipeline sends the image data of the processed second video frame to the interface. It should be understood that other image processing modules do not adjust the brightness of the second video frame, so even if other image processing modules process the second video frame, the brightness of the second video frame will not change.

By adjusting the brightness of the video frame through the above step 5011, the overall brightness of the display panel is effectively controlled when displaying the video frame with adjusted brightness. By adjusting the brightness of the video frame through the above step 5022, the overall brightness of the static video frame is effectively controlled when displaying the video frame with adjusted brightness.

In 503, the timing controller drives the display panel to display the second video frame.

As shown in FIG. 6 and FIG. 7, if the brightness adjustment module is the last image processing module in the image processing pipeline, after the second brightness adjustment unit acquires the image data of the second video frame, it sends the image data of the second video frame to the interface of the timing controller connected to the display panel. The interface controls the display panel to display the second video frame based on the image data.

If there are other image processing modules after the brightness adjustment module in the image processing pipeline, the second brightness adjustment unit outputs the image data of the second video frame to other image processing modules, which further process the second video frame. Ultimately, the last image processing module in the image processing pipeline sends the image data of the processed second video frame to the interface. It should be understood that other image processing modules do not adjust the brightness of the second video frame, so even if other image processing modules process the second video frame, the brightness of the second video frame will not change.

In 504, the timing controller controls the emission color and emission brightness of the light strip based on the color information of the first video frame and the total pixel brightness of the second video frame, wherein the color information indicates the color of the pixels of the first video frame.

This step 504 may be performed by the light strip control module in the timing controller.

Since the light strip control module is connected to the second brightness adjustment unit, after the second brightness adjustment unit acquires the total pixel brightness of the second video frame, it sends the total pixel brightness of the second video frame to the light strip control module. Accordingly, the light strip control module acquires the total pixel brightness of the second video frame. After acquiring the total pixel brightness of the second video frame, the light strip control module controls the emission color and the emission brightness of the light strip based on the color information of the first video frame and the total pixel brightness of the second video frame.

For example, the second brightness adjustment unit synchronizes the emission color of the light strip based on the color information of the first video frame, which makes the emission color of the light strip closer to the color of the second video frame, thereby improving the display effect of the light strip and enhancing the user's immersive experience.

Additionally, when the color information of the first video frame includes the total color values of multiple zones, the emission color of the light strip at each position is made the same as the color of the corresponding zone, which ensures that the color of each zone can be accurately displayed on the light strip and achieves fine-grained control of the light strip's color, thereby improving the display effect of the light strip and enhancing the user's immersive experience.

Furthermore, the second brightness adjustment unit synchronizes the emission brightness of the light strip based on the total pixel brightness of the second video frame, which makes the emission brightness of the light strip synchronize with the brightness of the second video frame displayed on the display panel, thereby improving the display effect of the light strip and enhancing the user's immersive experience.

It should be understood that steps 503 and 504 are performed simultaneously, such that the emission color of the light strip synchronizes with the color of the video frame displayed on the display panel, and the emission brightness of the light strip synchronizes with the brightness of the video frame displayed on the display panel.

The brightness adjustment module in the timing controller of the display module adjusts the brightness of the video frame to be played, and the display panel displays the adjusted video frame. The method according to the embodiments provided in the present disclosure sets up a light strip control module in the timing controller, such that the light strip control module acquires the total pixel brightness of the adjusted video frame and controls the emission color and emission brightness of the light strip based on the color and the adjusted total pixel brightness of the video frame, which makes the emission color and emission brightness of the light strip synchronize with the brightness and color of the video frames displayed on the display panel, thereby improving the display effect of the light strip and enhancing the user's immersive experience.

The embodiments shown in FIG. 5 take the fact that the second brightness adjustment unit provides the total pixel brightness of the second video frame to the light strip control module as an example. In other embodiments, the first brightness adjustment unit is further connected to the light strip control module, and the first brightness adjustment unit also provides the total pixel brightness to the light strip control module.

Taking FIG. 6 and FIG. 7 as examples, after the first brightness adjustment unit acquires the total pixel brightness of the fourth video frame, it sends the total pixel brightness of the fourth video frame to the light strip control module. Since the second brightness adjustment unit also sends the total pixel brightness of the second video frame to the light strip control module, the light strip control module may acquire the total pixel brightness of the fourth video frame and the total pixel brightness of the second video frame. If the total pixel brightness of the fourth video frame and the total pixel brightness of the second video frame are acquired, since the total pixel brightness of the second video frame is the actual total pixel brightness of the second video frame displayed on the display panel, the light strip control module will choose the total pixel brightness of the second video frame as the total pixel brightness of the first video frame, and control the emission color and emission brightness of the light strip based on the color information of the first video frame and the total pixel brightness of the second video frame.

If the second brightness adjustment unit is not enabled, it is not in operation. If the second brightness adjustment unit is not in operation, the first brightness adjustment module drives the display panel to display the fourth video frame and sends the total pixel brightness of the fourth video frame to the light strip control module. The light strip control module controls the emission color and emission brightness of the light strip based on the color information of the first video frame and the total pixel brightness of the fourth video frame, which makes the emission brightness of the light strip closer to the total pixel brightness of the second video frame, thereby avoiding the situation where the emission brightness of the light strip cannot be effectively controlled due to failing to acquire the total pixel brightness of the second video frame. The process of the first brightness adjustment module driving the display panel to display the fourth video frame is the same as the process of the second brightness adjustment module driving the display panel to display the second video frame.

Figure 11:
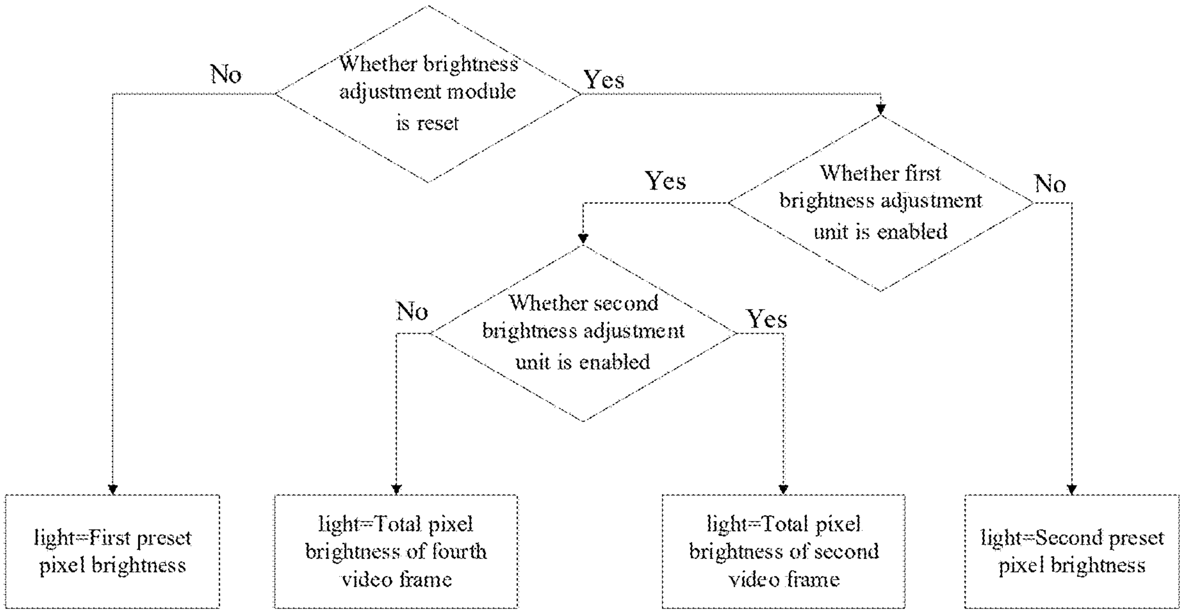
FIG. 11 is a flowchart of selecting a pixel brightness for a video frame to be played according to some embodiments of the present disclosure.

For example, as shown in the flowchart of the pixel brightness selection process for the video frame to be played provided in FIG. 11 of the present disclosure, the light strip control module detects whether the brightness adjustment module is reset. If the brightness adjustment module is not reset, the first preset pixel brightness is taken as the emission brightness of the light strip, and the emission color and emission brightness of the light strip are controlled based on the color information of the first video frame and the first preset pixel brightness. If the brightness adjustment module is reset, it detects whether the first brightness adjustment unit is enabled (i.e., whether it is in operation). If the first brightness adjustment unit is not enabled (i.e., not in operation), the second preset pixel brightness is taken as the emission brightness of the light strip, and the emission color and emission brightness of the light strip are controlled based on the color information of the first video frame and the second preset pixel brightness. If the first brightness adjustment unit is enabled (i.e., in operation), it detects whether the second brightness adjustment unit is enabled (i.e., whether it is in operation). If the second brightness adjustment unit is not enabled (i.e., not in operation), the total pixel brightness of the fourth video frame sent by the first brightness adjustment unit is taken as the emission brightness of the light strip, and the emission color and emission brightness of the light strip are controlled based on the color information of the first video frame and the total pixel brightness of the fourth video frame. If the second brightness adjustment unit is enabled, the total pixel brightness of the second video frame sent by the second brightness adjustment unit is taken as the emission brightness light of the light strip, and the emission color and emission brightness of the light strip are controlled based on the color information of the first video frame and the total pixel brightness of the second video frame. This ensures that the light strip control module can control the emission brightness of the light strip in various situations.

The embodiments shown in FIG. 5 to FIG. 11 all take the brightness adjustment module including multiple levels of brightness adjustment units as an example. In other embodiments, when the brightness adjustment module does not include multiple levels of brightness adjustment units, the brightness adjustment module adjusts the brightness of the pixels of the first video frame through the following adjustment method 1 or adjustment method 2.

Adjustment Method 1.

The brightness adjustment module adjusts the brightness of the pixels of the first video frame based on the brightness adjustment amplitude corresponding to the total pixel brightness of the first video frame among multiple brightness adjustment amplitudes, to acquire the second video frame and the total pixel brightness of the second video frame, where the multiple brightness adjustment amplitudes correspond to different total pixel brightness.

Adjustment Method 1 is the same as the above step 5021, and the details of Adjustment Method 1 are not repeated here. By adjusting the brightness of the video frame through Adjustment Method 1, the overall brightness of the display panel is effectively controlled when displaying the video frame with adjusted brightness.

Adjustment Method 2.

If the total pixel brightness of each third video frame in multiple third video frames is the same as the total pixel brightness of the first video frame, and the total display duration of the multiple third video frames is greater than or equal to a first duration, the brightness adjustment module reduces the brightness of the pixels of the first video frame to acquire the second video frame and the total pixel brightness of the second video frame, where the multiple third video frames are video frames displayed on the display panel preceding the second video frame.

Adjustment Method 2 is the same as the above step 5022, the difference being that in step 5022, the total brightness information of the fourth video frame acquired by the second adjustment unit is calculated by the first adjustment unit, while in Adjustment Method 2, the brightness adjustment module needs to calculate the total pixel brightness of the first video frame based on the image data of the first video frame. The details of Adjustment Method 2 are not repeated here. By adjusting the brightness of the video frame through Adjustment Method 2, the overall brightness of the static video frame is effectively controlled when displaying the video frame with adjusted brightness on the display panel.

After acquiring the image data and the total pixel brightness of the second video frame, the brightness adjustment module adjusts the brightness of the video frame through Adjustment Method 1, the overall brightness of the display panel is effectively controlled when displaying the video frame with adjusted brightness. For example, similar to the second brightness adjustment sub-module, it outputs the total pixel brightness of the second video frame to the light strip control module and the image data of the second video frame to the interface, such that the light strip control module controls the emission brightness of the light strip based on the total pixel brightness of the second video frame, and the interface drives the display panel to display the second video frame based on the image data of the second video frame.

In other embodiments, the timing controller also includes a blank screen maintenance module, which is configured to provide a blank screen maintenance function for the display panel. The blank screen maintenance function refers to controlling the display panel to be in a blank screen state for a certain duration (referred to as a third duration) to indicate that the display panel is in a blank screen maintenance state. For example, when the timing controller performs shutdown compensation for the display panel, it controls the display panel to be in the blank screen state, at which point the display panel is in the blank screen maintenance state. If the display panel is in the blank screen maintenance state, the light strip control module controls the emission effect of the light strip based on the blank screen maintenance progress of the display panel, such that the emission effect indicates the blank screen maintenance progress.

Figure 12:
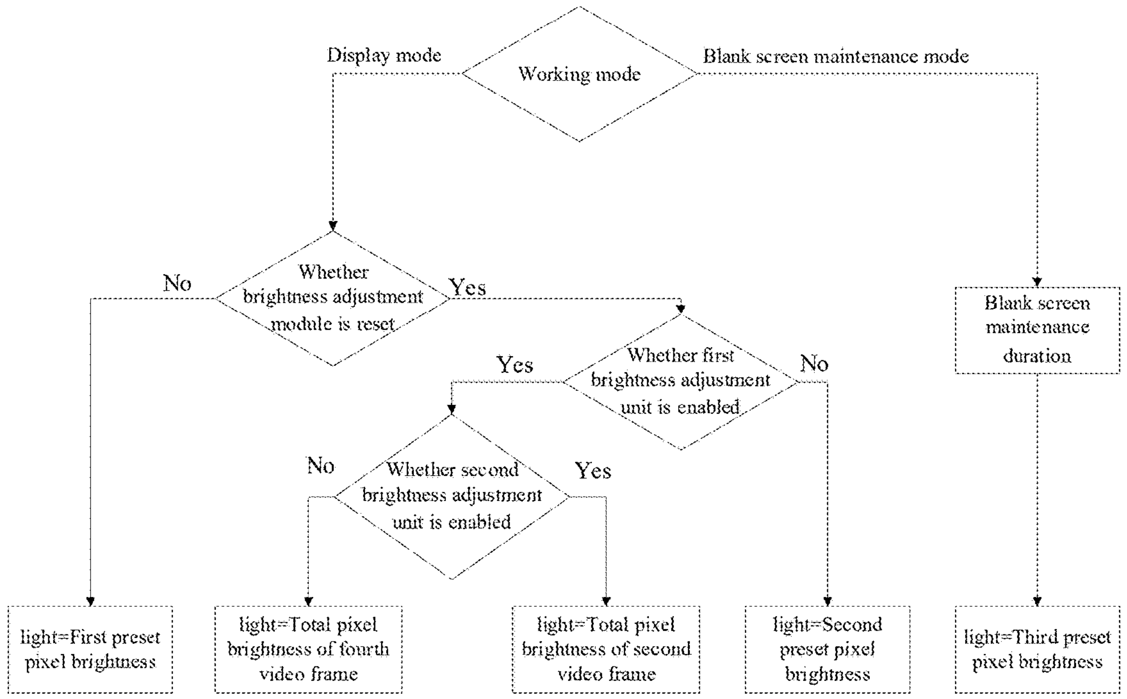
FIG. 12 is a flowchart of selecting a pixel brightness for a video frame to be played according to some embodiments of the present disclosure.

For example, as shown in the flowchart of the pixel brightness selection process for the video frame to be played provided in FIG. 12 of the present disclosure, the light strip control module detects the working mode of the display panel. If the working mode of the display panel is the display mode, the total pixel brightness of the video frame is selected according to the selection logic shown in FIG. 11, and the emission brightness of the light strip is controlled based on the selected total pixel brightness. If the working mode of the display panel is the blank screen maintenance mode, the display panel is in the blank screen maintenance state at this time, and the light strip control module acquires the blank screen maintenance duration (i.e., the third duration) from the blank screen maintenance module. The light strip control module takes the third preset pixel brightness as the emission brightness of the light strip and controls the entire light strip to emit light based on the third duration and the third preset pixel brightness. For example, taking a certain position on the light strip as the starting position, the light strip is controlled to start emitting light from the starting position and gradually increase the length of the emitting light along the light strip until the entire light strip is fully emitting light after the third duration. Thus, the emission progress of the light strip is used to indicate the blank screen maintenance progress of the display panel to the user.

The above embodiments are all described with the timing controller including various modules as an example. In other embodiments, the timing controller does not distinguish between modules internally, and the functions of the various modules are realized by the timing controller.

In some embodiments, the light strip control module is not set inside the timing controller or inside the SoC, but is set in the display module and independent of the timing controller, or is set outside the display module and independent of the SoC, which reduces the development costs of the timing controller and the SoC.

In exemplary embodiments, a computer-readable storage medium is also provided, such as a memory including program code, which can be performed by the timing controller introduced above to complete the method for controlling the light strip based on the display module in the above embodiments. Alternatively, it can be performed by the light strip control module to complete the method for controlling the light strip based on the display module in the above embodiments. The computer-readable storage medium can be a read-only memory (ROM), random access memory (RAM), compact disc read-only compact disc (CD-ROM), magnetic tape, floppy disk, and optical data storage device, etc.

It should be noted that the information (including but not limited to user device information, user personal information, etc.), data (including but not limited to data for analysis, storage, and display, etc.), and signals involved in the present disclosure are all acquired with user authorization or full authorization from all parties, and the collection, use, and processing of related data comply with relevant laws, regulations, and standards of the relevant countries and regions. For example, the video streams involved in the present disclosure are all acquired with full authorization.

A person of ordinary skill in the art can understand that all or part of the steps in the above embodiments can be completed through hardware, or through program instructions related hardware, and the program can be stored in a computer-readable storage medium. The storage medium mentioned above can be a read-only memory, a magnetic disk, an optical disk, etc.

The above description is only an optional embodiment of the present disclosure and is not intended to limit the present disclosure. Any modifications, equivalent replacements, improvements, etc., made within the spirit and principles of the present disclosure should be included within the protection scope of the present disclosure.

The invention claimed is:

1. A display module, comprising a display panel and a timing controller, the display panel being connected to the timing controller, and a light strip being disposed at a periphery of the display panel; wherein the timing controller comprises a brightness adjustment module and a light strip control module, wherein the brightness adjustment module is connected to the light strip control module, and the light strip control module is connected to the light strip; wherein the brightness adjustment module comprises a first processor, and the light strip control module comprises a second processor;

the first processor is configured to adjust brightness of pixels of a first video frame to be played to acquire a second video frame and a total pixel brightness of the second video frame;

the first processor is further configured to drive the display panel to display the second video frame and send the total pixel brightness of the second video frame to the light strip control module; and the second processor is configured to control an emission color and emission brightness of the light strip based on color information of the first video frame and the total pixel brightness of the second video frame, wherein the color information indicates colors of the pixels of the first video frame.

2. The display module according to claim 1, wherein the first processor is configured to:

adjust the brightness of the pixels of the first video frame based on a brightness adjustment amplitude corresponding to a total pixel brightness of the first video frame among a plurality of brightness adjustment amplitudes to acquire the second video frame and the total pixel brightness of the second video frame, wherein the plurality of brightness adjustment amplitudes correspond to different total pixel brightness.

3. The display module according to claim 1, wherein the first processor is configured to:

in a case that a total pixel brightness of each third video frame in a plurality of third video frames is the same as a total pixel brightness of the first video frame, and a total display duration of the plurality of third video frames is greater than or equal to a first duration, reduce the brightness of the pixels of the first video frame to acquire the second video frame and the total pixel brightness of the second video frame, wherein the plurality of third video frames are video frames displayed on the display panel preceding the second video frame.

4. The display module according to claim 1, wherein the brightness adjustment module comprises a first brightness adjustment unit and a second brightness adjustment unit, wherein the first brightness adjustment unit, the second brightness adjustment unit, and the display panel are connected in sequence, and the second brightness adjustment unit is further connected to the light strip control module; wherein the first brightness adjustment unit comprises a first sub-processor, and the second brightness adjustment unit comprises a second sub-processor;

the first sub-processor is configured to adjust the brightness of the pixels of the first video frame based on a brightness adjustment amplitude corresponding to a total pixel brightness of the first video frame among a plurality of brightness adjustment amplitudes to acquire a fourth video frame and a total pixel brightness of the fourth video frame, and send the fourth video frame and the total pixel brightness of the fourth video frame to the second brightness adjustment unit, wherein the plurality of brightness adjustment amplitudes correspond to different total pixel brightness;

the second sub-processor is configured to, in a case that a total pixel brightness of each third video frame in a plurality of third video frames is the same as the total pixel brightness of the fourth video frame, and a total display duration of the plurality of third video frames is greater than or equal to a first duration, reduce the brightness of pixels of the fourth video frame to acquire the second video frame and the total pixel brightness of the second video frame, wherein the plurality of third video frames are video frames displayed on the display panel preceding the second video frame; and the second sub-processor is further configured to drive the display panel to display the second video frame and send the total pixel brightness of the second video frame to the light strip control module.

5. The display module according to claim 4, wherein the first brightness adjustment unit is further connected to the display panel and the light strip control module;

the first sub-processor is further configured to, in a case that the second brightness adjustment unit is not in operation, drive the display panel to display the fourth video frame and send the total pixel brightness of the fourth video frame to the light strip control module; and the second processor is configured to control the emission color and the emission brightness of the light strip based on the color information and the total pixel brightness of the fourth video frame.

6. The display module according to claim 4, wherein the first brightness adjustment unit is further connected to the display panel and the light strip control module;

the first sub-processor is further configured to send the total pixel brightness of the fourth video frame to the light strip control module; and the second processor is further configured to, in a case that the total pixel brightness of the fourth video frame and the total pixel brightness of the second video frame are acquired, control the emission color and the emission brightness of the light strip based on the color information and the total pixel brightness of the second video frame.

7. The display module according to claim 1, wherein the timing controller is connected to a system-on-chip of the display module; wherein the first processor is configured to acquire the first video frame from the system-on-chip; and the second processor is configured to acquire the color information from the system-on-chip.

8. The display module according to claim 1, wherein the timing controller is connected to the system-on-chip of the display module;

the first processor is configured to acquire the first video frame from the system-on-chip; and the second processor is configured to acquire the color information of the first video frame by performing a color extraction on the first video frame.

9. The display module according to claim 8, wherein the first video frame comprises a plurality of zones, and the color information comprises total color values corresponding to each zone of the plurality of zones, wherein each total color value is a sum of color values of pixels in the zone;

the second processor is further configured to:

divide the first video frame into the plurality of zones, wherein the plurality of zones are all located at an edge of the first video frame;

acquire the total color values corresponding to each zone of the plurality of zones based on the color values of the pixels in the each zone;

the second processor is further configured to:

in a case that the display panel is in a blank screen maintenance state, control an emission effect of the light strip based on a blank screen maintenance progress of the display panel, such that the emission effect indicates the blank screen maintenance progress.

10. A method for controlling a light strip based on the display module as defined in claim 1, the method being performed by the timing controller and comprising:

adjusting brightness of pixels of a first video frame to be played to acquire a second video frame and a total pixel brightness of the second video frame;

driving the display panel to display the second video frame;

controlling an emission color and emission brightness of the light strip based on color information of the first video frame and the total pixel brightness of the second video frame, wherein the color information indicates colors of the pixels of the first video frame.

11. The method according to claim 10, wherein adjusting the brightness of the pixels in the first video frame to be played to acquire the second video frame and the total pixel brightness of the second video frame comprises:

adjusting the brightness of the pixels of the first video frame based on a brightness adjustment amplitude corresponding to a total pixel brightness of the first video frame among a plurality of brightness adjustment amplitudes to acquire the second video frame and the total pixel brightness of the second video frame, wherein the plurality of brightness adjustment amplitudes correspond to different total pixel brightness.

12. The method according to claim 10, wherein adjusting the brightness of the pixels in the first video frame to be played to acquire the second video frame and the total pixel brightness of the second video frame comprises:

in a case that a total pixel brightness of each third video frame in a plurality of third video frames is the same as a total pixel brightness of the first video frame, and a total display duration of the plurality of third video frames is greater than or equal to a first duration, reducing the brightness of the pixels of the first video frame to acquire the second video frame and the total pixel brightness of the second video frame, wherein the plurality of third video frames are video frames displayed on the display panel preceding the second video frame.

13. The method according to claim 10, wherein adjusting the brightness of the pixels in the first video frame to be played to acquire the second video frame and the total pixel brightness of the second video frame comprises:

adjusting the brightness of the pixels of the first video frame based on a brightness adjustment amplitude corresponding to a total pixel brightness of the first video frame among a plurality of brightness adjustment amplitudes to acquire a fourth video frame and a total pixel brightness of the fourth video frame, wherein the plurality of brightness adjustment amplitudes correspond to different total pixel brightness;

in a case that a total pixel brightness of each third video frame in a plurality of third video frames is the same as the total pixel brightness of the fourth video frame, and a total display duration of the plurality of third video frames is greater than or equal to a first duration, reducing the brightness of pixels of a fourth video frame to acquire the second video frame and the total pixel brightness of the second video frame, wherein the plurality of third video frames are video frames displayed on the display panel preceding the second video frame.

14. The method according to claim 13, wherein after acquiring the fourth video frame and the total pixel brightness of the fourth video frame, the method further comprises:

driving the display panel to display the fourth video frame;

controlling the emission color and the emission brightness of the light strip based on the color information and the total pixel brightness of the fourth video frame.

15. The method according to claim 10, wherein before controlling the emission color and the emission brightness of the light strip based on the color information of the first video frame and the total pixel brightness of the second video frame, the method comprises:

acquiring the first video frame and the color information from a system-on-chip of the display module.

16. The method according to claim 10, wherein before controlling the emission color and the emission brightness of the light strip based on the color information of the first video frame and the total pixel brightness of the second video frame, the method comprises:

acquiring the first video frame from a system-on-chip of the display module;

acquiring the color information of the first video frame by performing a color extraction on the first video frame.

17. The method according to claim 16, wherein the first video frame comprises a plurality of zones, and the color information comprises total color values corresponding to each zone of the plurality of zones, wherein each total color value is a sum of color values of pixels in the zone;

acquiring the color information of the first video frame by performing the color extraction on the first video frame comprises:

dividing the first video frame into the plurality of zones, wherein the plurality of zones are all located at an edge of the first video frame;

acquiring the total color values corresponding to each zone of the plurality of zones based on the color values of the pixels in the zone.

18. The method according to claim 10, further comprising:

in a case that the display panel is in a blank screen maintenance state, controlling an emission effect of the light strip based on a blank screen maintenance progress of the display panel, such that the emission effect indicates the blank screen maintenance progress.

19. A display device, comprising a system-on-chip and a display module, wherein the system-on-chip is configured to provide video frames to be played to the display module, and the display module comprises a display panel and a timing controller, the display panel being connected to the timing controller, and a light strip being disposed at a periphery of the display panel; wherein the timing controller comprises a brightness adjustment module and a light strip control module, wherein the brightness adjustment module is connected to the light strip control module, and the light strip control module is connected to the light strip; wherein the brightness adjustment module comprises a first processor, and the light strip control module comprises a second processor;

the first processor is configured to adjust brightness of pixels of a first video frame of the video frames to be played to acquire a second video frame and a total pixel brightness of the second video frame;

the first processor is further configured to drive the display panel to display the second video frame and send the total pixel brightness of the second video frame to the light strip control module; and the second processor is configured to control an emission color and emission brightness of the light strip based on color information of the first video frame and the total pixel brightness of the second video frame, wherein the color information indicates colors of the pixels of the first video frame.

20. A non-transitory computer-readable storage medium storing at least one program code, wherein the at least one program code, when loaded and executed by a timing controller of a display module, causes the timing controller to perform:

adjusting brightness of pixels of a first video frame to be played to acquire a second video frame and a total pixel brightness of the second video frame;

driving a display panel to display the second video frame; and controlling an emission color and emission brightness of a light strip based on color information of the first video frame and the total pixel brightness of the second video frame, wherein the color information indicates colors of the pixels of the first video frame.

* * * * *